United States Patent
Diggins (10) Patent No.: US 9,852,489 B2
(45) Date of Patent: Dec. 26, 2017

(54) METHOD AND APPARATUS FOR MODIFYING A VIDEO STREAM TO ENCODE METADATA

(71) Applicant: Snell Limited, Lower Earley (GB)

(72) Inventor: Jonathan Diggins, Lovedean (GB)

(73) Assignee: Snell Advanced Media Limited, Newbury, Berkshire (GB)

( * ) Notice: Subject to any disclaimer, the term of this patent is extended or adjusted under 35 U.S.C. 154(b) by 0 days.

(21) Appl. No.: 15/091,704

(22) Filed: Apr. 6, 2016

(65) Prior Publication Data

US 2016/0217544 A1    Jul. 28, 2016

Related U.S. Application Data

(63) Continuation of application No. 14/103,068, filed on Dec. 11, 2013, now Pat. No. 9,330,428.

(51) Int. Cl.
*G06K 9/00* (2006.01)
*G06K 9/40* (2006.01)
*G06T 1/00* (2006.01)

(52) U.S. Cl.
CPC ............ *G06T 1/005* (2013.01); *G06T 1/0028* (2013.01); *G06T 2201/0061* (2013.01); *G06T 2201/0065* (2013.01)

(58) Field of Classification Search
CPC combination set(s) only.
See application file for complete search history.

(56) References Cited

U.S. PATENT DOCUMENTS

| | | | |
|---|---|---|---|
| 6,642,967 | B1 | 11/2003 | Saunders |
| 6,876,815 | B1 | 4/2005 | McGrath |
| 7,222,163 | B1 | 5/2007 | Girouard et al. |
| 2002/0001395 | A1 | 1/2002 | Davis et al. |
| 2002/0118862 | A1 | 8/2002 | Sugimoto et al. |
| 2003/0210821 | A1 | 11/2003 | Yogeshwar et al. |
| 2004/0096110 | A1 | 5/2004 | Yogeshwar et al. |
| 2004/0220926 | A1 | 11/2004 | Lamkin et al. |
| 2005/0169544 | A1 | 8/2005 | Clark |
| 2005/0175085 | A1 | 8/2005 | Bergen et al. |
| 2005/0223034 | A1 | 10/2005 | Kaneko et al. |
| 2006/0251289 | A1* | 11/2006 | Williams .............. G06T 1/0085 382/100 |
| 2007/0074265 | A1 | 3/2007 | Bennett et al. |
| 2007/0086664 | A1 | 4/2007 | Kim et al. |

(Continued)

OTHER PUBLICATIONS

Search report from priority application No. GB1222397.0. Date of search Jun. 5, 2013.

*Primary Examiner* — Alex Liew
(74) *Attorney, Agent, or Firm* — Woodard, Emhardt, Moriarty, McNett & Henry LLP; William McKenna; Kenneth Gandy (57) ABSTRACT

A watermark encoder receives a current video image together with current metadata associated with the current image. A metadata delay also makes available to the watermark decoder delayed metadata associated respectively with four or more of the preceding. Then the watermark encoder modifies pixel values of the current image not only to encode the current metadata but also the delayed metadata. At a decoder, if metadata for the current image is corrupted or missing, it can be recovered from one of the succeeding images.

2 Claims, 6 Drawing Sheets

(56) References Cited

U.S. PATENT DOCUMENTS

| | | |
|---|---|---|
| 2007/0269118 A1* | 11/2007 | Sasaki .................... H04N 19/70 382/232 |
| 2008/0159639 A1 | 7/2008 | Dvir et al. |
| 2008/0219573 A1* | 9/2008 | Lu .......................... H04N 19/61 382/236 |
| 2009/0116812 A1 | 5/2009 | O'Brien et al. |
| 2009/0124903 A1* | 5/2009 | Osaka ...................... A61B 8/12 600/443 |
| 2010/0124353 A1 | 5/2010 | Cohen |
| 2012/0038782 A1* | 2/2012 | Messmer ............ H04N 19/467 348/207.1 |

\* cited by examiner

METHOD AND APPARATUS FOR MODIFYING A VIDEO STREAM TO ENCODE METADATA

CROSS-REFERENCE TO RELATED APPLICATION

This application is a continuation application of U.S. patent application Ser. No. 14/103,068, filed Dec. 11, 2013 which claims the benefit of Great Britain Application No. GB 1222397.0, filed Dec. 12, 2012, the entire disclosure of which is hereby incorporated by reference.

FIELD OF INVENTION

This invention concerns the transmission of metadata related to an image sequence.

BACKGROUND OF THE INVENTION

It is very often necessary to associate data with a motion-image stream. In television so-called 'metadata' is frequently associated with one or more fields or frames of analogue or digital video. Typically the data associated with a field or frame describes parameters of that field or frame. Examples of parameters that can be carried by metadata include: identification of the video; timecode or frame number; the intended display aspect-ratio; or, a 'signature' of the field or frame that enables comparison with fields or frames in another video stream. For convenience, the term "video image" will sometimes be used in this specification to mean either video frame or video field.

The association between the metadata and its respective image is frequently achieved by carrying the metadata in the blanking intervals of television signals, but, because these intervals are discarded by some video processing equipment, the metadata can be lost, or delayed differently from the video itself. This difficulty can be avoided by encoding the metadata within the active area of the video frames; this technique is known as 'watermarking'. Typical watermarks are intended to be imperceptible to a viewer; known watermarking algorithms include methods that modify the frequency spectrum of the video, and methods that add low amplitude data signals to the video signal.

Although including the metadata within the image frame ensures that the association between the metadata and the video data cannot be lost, modern video processing techniques, especially those which combine spatially-separated and/or temporally-separated pixels, can distort the metadata. As typical metadata carried by watermarking only causes small changes to the values of pixels (because of the requirement for low visibility of the watermark) it may be impossible to decode the metadata after the video has been edited or re-formatted for a different distribution channel.

There is thus a need to carry metadata associated with fields or frames of a motion-image stream in a robust manner that prevents the metadata from being lost or damaged by video processing.

SUMMARY OF THE INVENTION

The invention consists in a method and apparatus for modifying a video data stream to encode a plurality and preferably at least four sets of metadata that respectively describe a plurality and preferably at least four video fields or frames preceding a current field or frame by modification of data defining the pixel values of that current field or frame.

In a preferred embodiment every field or frame is modified to encode metadata associated with itself and at least four immediately preceding fields or frames.

Advantageously, pixel activity is measured preferably by rectification of the output of a spatial filter and pixel values are only modified when activity measured within a region surrounding the pixel to be modified exceeds a threshold.

Suitably, identical modifications are applied to (preferably the low-significance bits defining the values of) all the pixels of a contiguous set of pixels comprising a spatial region within a field or frame so as to encode one or more bits of metadata within that spatial region of that field or frame.

In a preferred embodiment the two least-significant bits of a ten-bit value are modified.

In some embodiments low-significance bits defining the values of a contiguous set of pixels in a spatial region within a field or frame are modified so as to encode a fixed data value within that region that aids the recognition of that fixed data value when encoded in a different spatial region within the said field or frame.

Advantageously, identical data is encoded in a plurality of spatial regions within the same field or frame.

In a further aspect the invention consists in a method and apparatus for processing a video data stream to decode at least four sets of metadata that respectively describe at least four video fields or frames preceding a current field or frame in which decoded metadata describing a previous field or frame is decoded from a later field or frame and associated with a stored or delayed copy of the said preceding field or frame.

Preferably the said decoding comprises the steps of:
measuring the frequencies of occurrence of at least two combinations of values of low-significance pixel-value bits within a first spatial region within a field or frame
measuring the frequencies of occurrence of at least two combinations of values of low-significance pixel-value bits within a second spatial region within the said field or frame
determining an encoded metadata parameter from a comparison of the frequencies of occurrence of combinations of low-significance pixel-value bits in the said first and second spatial regions of the said field or frame.

DETAILED DESCRIPTION OF THE INVENTION

A common video process that is particularly damaging to watermarks is standards conversion, particularly frame-rate conversion. A typical frame-rate converter generates new fields or frames from input fields or frames by means of a temporal filter. Usually the filter forms each new field or frame from a weighted sum of input fields or frames. The weights are determined according to a filter aperture function that defines the relationship between the weight to be applied, and the time of the output field or frame with respect to the timing of the contributing input fields or frames. This time relationship is usually expressed as a temporal phase value. Typical frame-rate converters working between interlaced video formats combine four interlaced input fields to generate an output field. That is to say the filter aperture is four fields wide.

The inventor has appreciated that, in a field-rate conversion process, the temporal phase of the conversion filter will vary cyclically, so that, at regular intervals, one input field or frame will provide the dominant contribution to the converter's output. For example, when the time of a particular input interlaced field coincides with the time of an output interlaced field there will be substantially zero contribution to the output from earlier or later input fields. This means that the impairment of a watermark due to standards conversion will vary cyclically, and substantially unimpaired data will be available at regular intervals.

The time period of the cyclic variation corresponds to the frequency difference between input and output field rates. For example, when converting between nominal 60 Hz and nominal 50 Hz field rates, the temporal phase falls to a minimum value every six 60 Hz fields, or every five 50 Hz fields. And, when converting between 24 Hz frames and 25 Hz frames, the temporal phase falls to a minimum value every twenty-four 24 Hz fields, or every twenty-five 25 Hz fields. Typically the input and output rates of a video conversion process are not precisely 'locked' together and so the minimum temporal phase value that occurs at the difference frequency will, itself vary. There is no certainty that phase coincidence between input and output will occur. However, lower minimum values will occur when the frequency difference is small.

Figure 1:
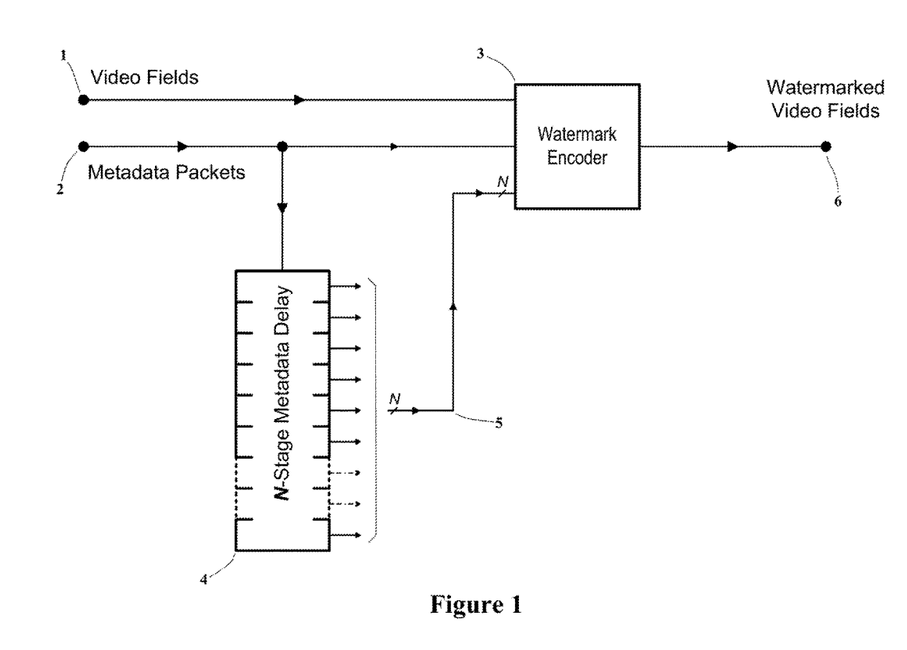
FIG. 1 shows a block diagram of a metadata encoding process according to an example of the invention.

FIG. 1 shows a metadata encoding system according to an example of the invention.

Video fields (1) and associated metadata packets (2), comprising metadata applicable to or describing the respective video field, are input to a watermark encoder (3). The metadata packets (2) may be carried in the blanking intervals of the video fields (1), or the association between respective fields and metadata packets may be achieved by some other means, for example a defined time relationship. The metadata packets (2) are also input to an N-stage delay (4) that provides a set of N delayed metadata outputs (5) which correspond to the N metadata packets respectively associated with the N previous fields. As each new video field (1) is input to the system, a corresponding current-field metadata packet (2), and set of N delayed metadata packets (5) is input to the watermark encoder (3).

The watermark encoder (3) combines the N+1 metadata packets with the video fields (1) to generate watermarked video fields (6), which are output for storage or distribution. The combination process in the watermark encoder (3) makes minimal change to the subjective appearance of the video material so that the watermark is substantially invisible when the video fields are displayed. A suitable combination process is described below with reference to FIG. 3.

Figure 2:
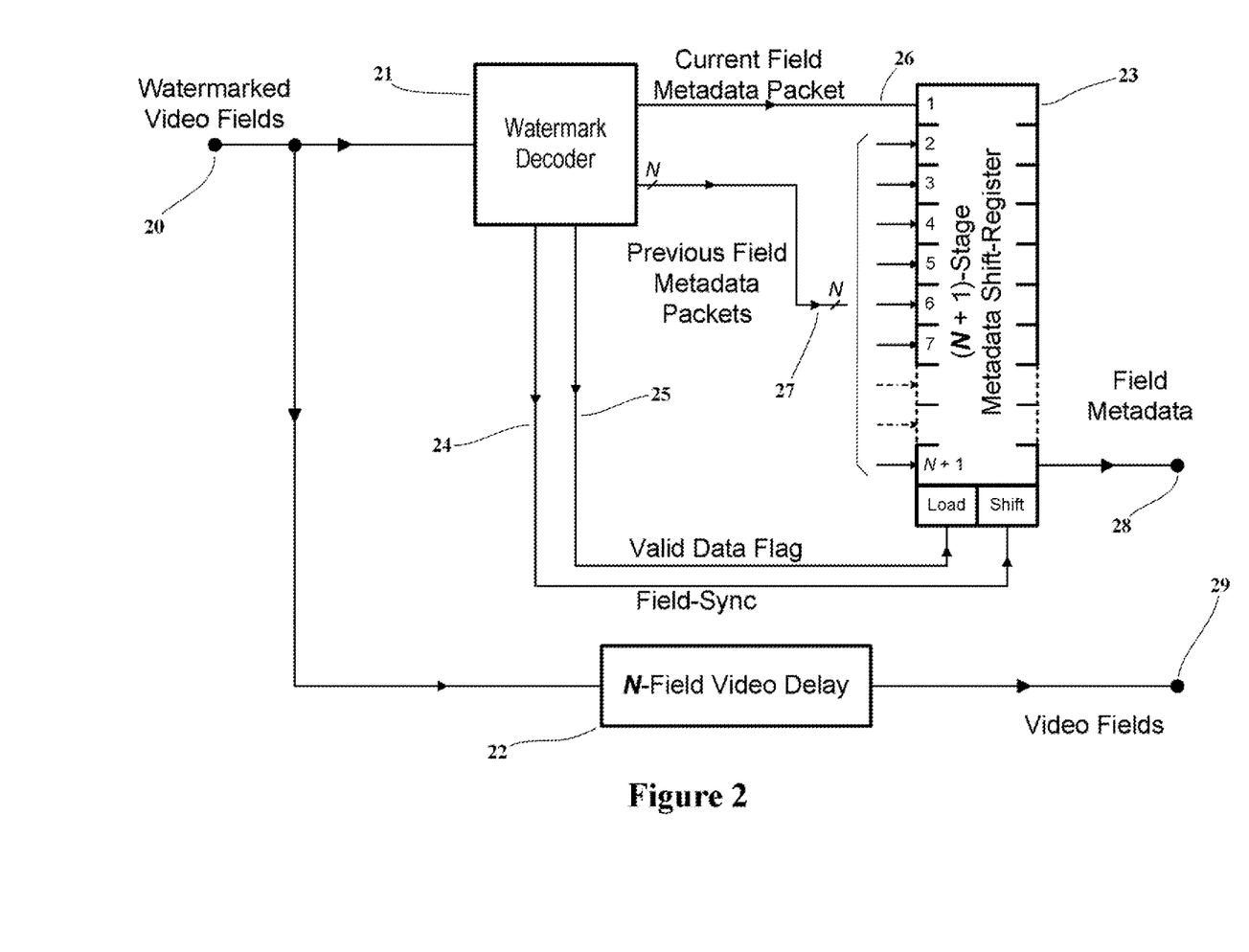
FIG. 2 shows a block diagram of a metadata decoding process according to an example of the invention.

An exemplary method of extracting the metadata from the watermarked video fields (6) will now be described with reference to FIG. 2. Input watermarked video fields (20) are passed to a watermark decoder (21) and an N-field video delay (22). The watermark decoder (21) extracts the N+1 metadata packets from the watermarked video fields (20) and inputs them, in parallel, into an (N+1)-stage shift register (23). Output metadata packets from the system are delivered serially from the shift register's $(N+1)^{th}$ output (28).

The watermark decoder (21) also outputs a Field Sync signal (24), which is asserted once per input field; and, a Valid Data Flag (25), which is asserted when all of the N+1 metadata packets decoded from the current input field are considered to be valid. Note that, as explained above, valid data may only be obtained from a regularly-occurring subset of the input fields (20).

When the Valid Data Flag (25) is asserted, the decoded metadata packet (26) corresponding to the current field is loaded into the first stage of the shift-register (23) (which is furthest from its serial output (28)). And, the N metadata packets (27) corresponding to earlier fields (but decoded from the current field) are loaded into the remaining stages of the shift-register (23) so that the packet corresponding to the earliest field is loaded into the $(N+1)^{th}$ (output) stage, and the metadata packet corresponding to the field immediately preceding the current field is loaded into the second stage. Once per input field, after the loading process (if any), the contents of the shift register (23) are shifted one stage towards the $(N+1)^{th}$ (output) stage; and, the metadata packet corresponding to the $N^{th}$ field before the current field is output at the serial output (28) from the shift-register (23).

Provided that a set of (N+1) metadata packets can be decoded at least once every (N+1) fields, a metadata packet (28) will be output from the shift register (23) at the same time as the corresponding video field (29) is output from the N-field video delay (22). Thus metadata for all fields more than (N+1) fields before the current field is available, even if data can only be decoded intermittently.

The delayed metadata (28) at the output of the shift register (23) is associated with the video fields (29) at the output of the video delay (22) by virtue of co-timing. If necessary the metadata packets can be inserted into the blanking intervals of the respective co-timed video fields, or some other method of association may be used to maintain the association in subsequent processing.

A suitable method for carrying metadata as a watermark within an image field represented by a set of pixel values will now be described. The values of low-significance bits of the pixel values are modified in dependence on the metadata. The image area is divided into a regular array of 'tiles' and within each tile all the pixels are modified in the same way. Preferably however, the modification is restricted to detailed areas so as to reduce the visibility of the watermark.

Figure 3:
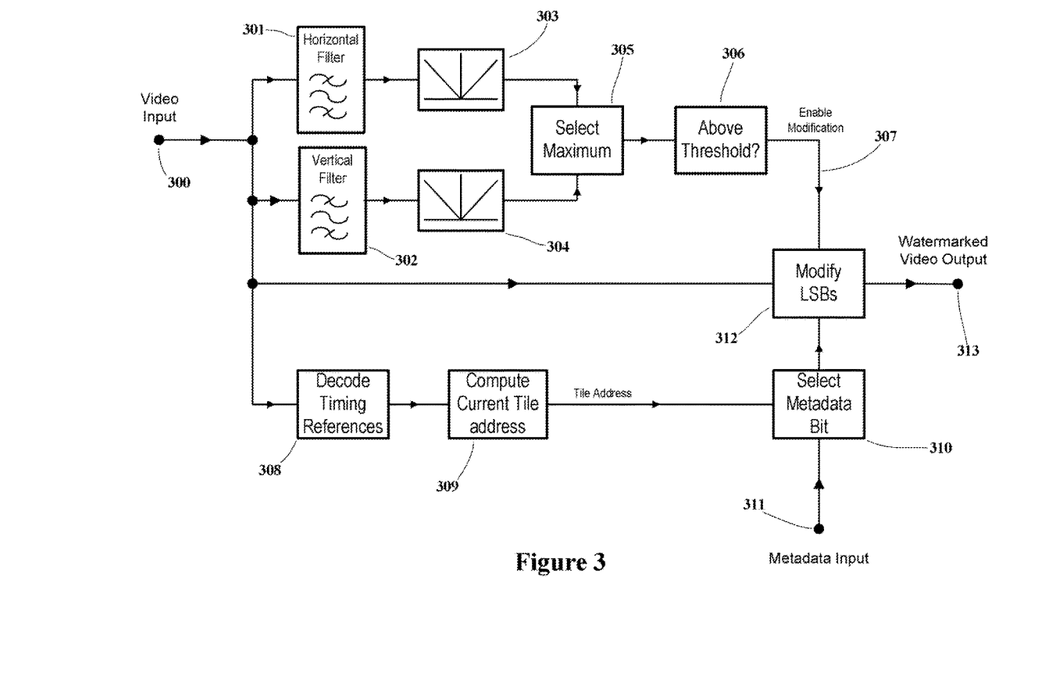
FIG. 3 shows a block diagram of a system for encoding metadata in the pixels of an image.

A system according to these principles is illustrated in FIG. 3. Input video (300), which comprises pixel values, and timing references that enable the spatial positions of pixels within each frame to be determined, is input to the system. Areas within each field that are suitable for watermark coding are identified by measuring an 'activity value' dependant on local spatial-frequency energy. Spatial filters (301) and (302) isolate the lower-middle horizontal frequency components, and the lower-middle vertical frequency components, respectively. The respective filter outputs are rectified in rectifiers (303) and (304) to produce a horizontal activity measure, and a vertical activity measure; the greater of these two measures is selected by a maximum value selector (305), and passed to a threshold comparator (306). If the selected activity measure is above a threshold, an enabling signal (307) is generated which indicates that the current pixel is suitable for modification by watermark data.

Typically the filters (303) and (304) have a band-pass response centred around one quarter of the respective Nyquist frequency for the image horizontal and vertical sampling frequencies. Coefficient values for a suitable FIR filter are:

| | Sample Position | | | | | | | | | | |
|---|---|---|---|---|---|---|---|---|---|---|---|
| | −5 | −4 | −3 | −2 | −1 | 0 | +1 | +2 | +3 | +4 | +5 |
| Weight | −1 | −2 | −1 | 0 | 2 | 4 | 2 | 0 | −1 | −2 | −1 |

A suitable activity threshold value for processing luminance signal is around one fortieth of the peak white level.

As the skilled person will appreciate, the filter outputs need to be co-timed with the current pixel, and suitable compensating delays can be used to achieve this. For clarity, such delays are not shown in the Figure.

A timing reference decoder (308) extracts the timing information from the video input (300) and passes it to a tile address generator (309). The video fields are divided into spatial regions—tiles—each of which will carry one or more bits of metadata. The position of each tile within the field is identified by a tile address. A tile address generator (309) passes the address of the tile in which the current pixel is situated to a metadata bit selector (310). Metadata (311) to be carried in the current field is input to the metadata bit selector (310), which selects the bit or bits of metadata to be carried in the current tile, and passes them to an LSB modification block (312).

The LSB modification block (312) receives the input video (300) and, if the enabling signal (307) is active, modifies low-significance bits of the value of the current pixel of the video (300) in dependence upon the metadata bit or bits selected by the metadata bit selector (310). If the enabling signal (307) is inactive, the modification block (312) makes no modification to the value of the current pixel. The modification block (312) outputs the selectively modified video data as a watermarked video output (313).

A suitable watermarking technique for 10-bit video data is to modify the two least-significant bits of the pixel value to carry one metadata bit. Therefore, in this example, the modification block (312) sets the least significant bit to zero, and next-most significant bit is set equal to the metadata bit.

Figure 4:
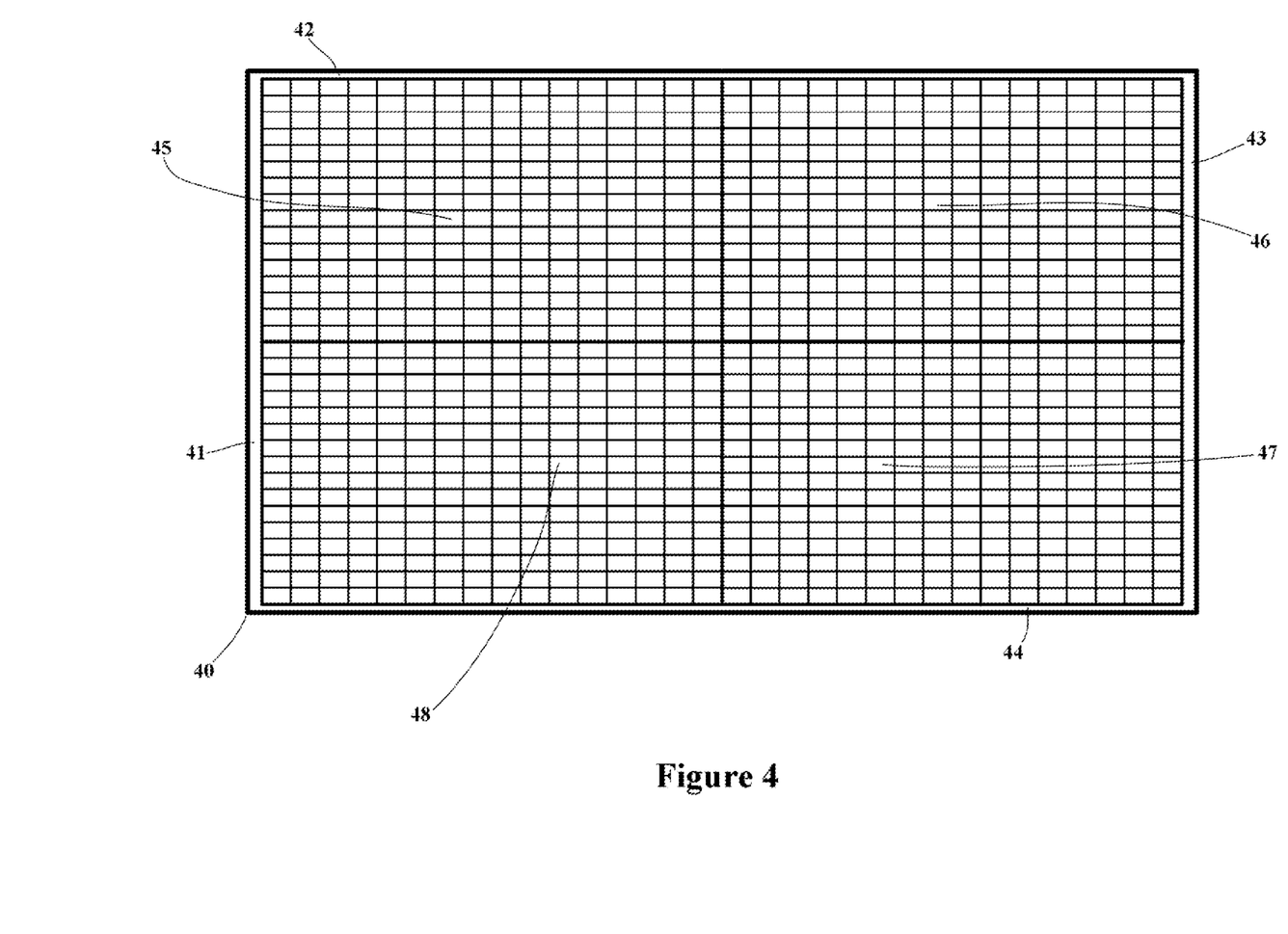
FIG. 4 shows the spatial division of an image into tiles and quadrants.

As explained above, the image is divided into tiles, and all the qualifying pixels in a tile carry the same metadata bit (or bits in other examples). A suitable arrangement of tiles is shown in FIG. 4. The image (40) is divided into 1024 equally-sized tiles, excluding the image edge regions (41), (42), (43) and (44). The horizontal and vertical tile dimensions are chosen to be a convenient multiple of the respective pixel pitches, so that every tile contains the same number of pixels. The tiles are grouped into four equally-sized quadrants (45), (46), (47) and (48). Each quadrant carries the same data so as to increase the likelihood that suitable pixels are available for coding, and to provide redundancy.

Figure 5:
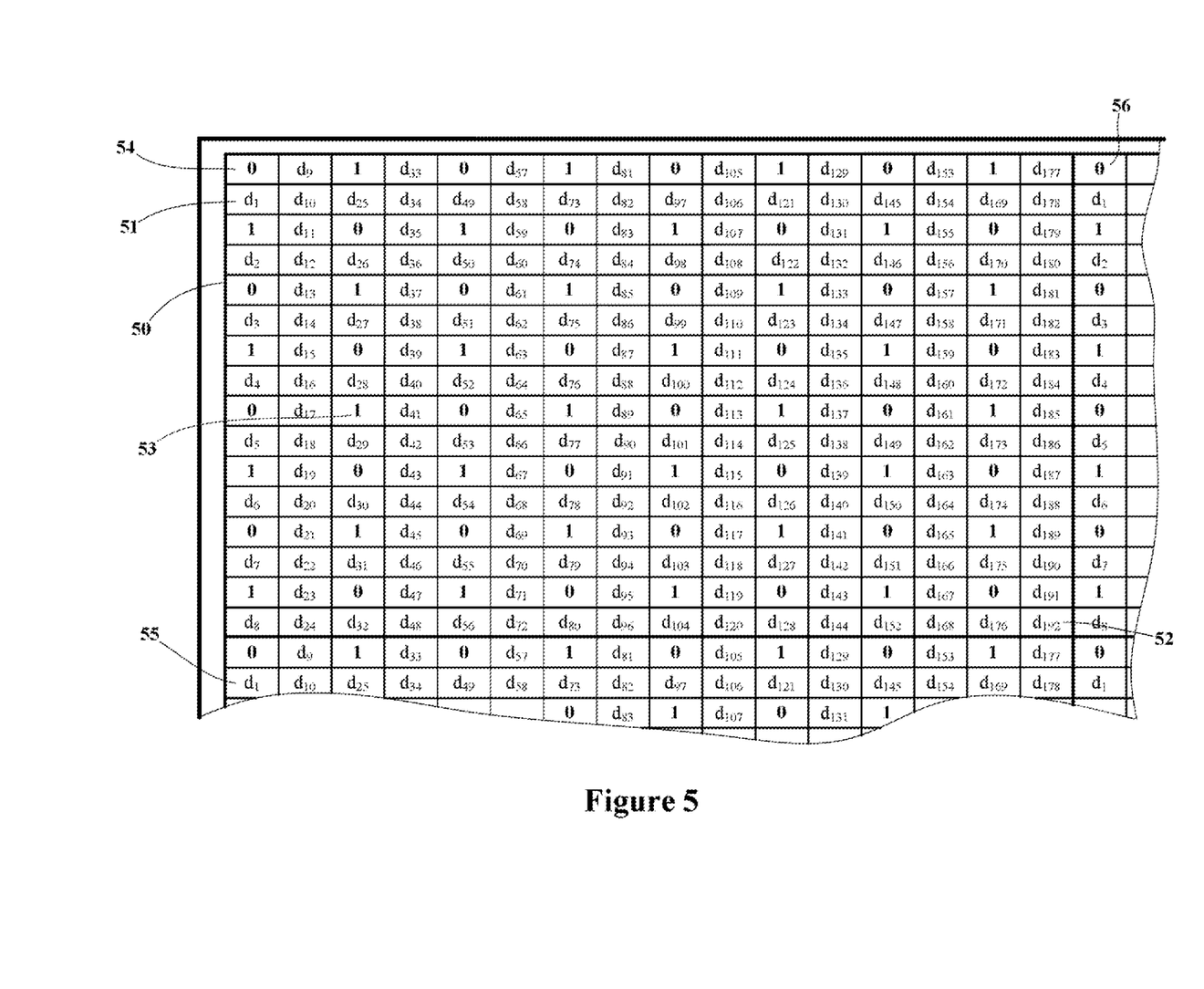
FIG. 5 shows an allocation of data values to tiles within an image quadrant.

FIG. 5 shows how the metadata bits are allocated to the tiles. It shows an expanded view of the top left quadrant (45) of FIG. 4, and a few adjacent tiles in the top right and bottom left quadrants. Of the 256 tiles in each quadrant, 192 tiles carry data bits $d_1$ to $d_{192}$ respectively. In the top left quadrant (50), the leftmost tile in the second row (51) carries data bit $d_1$, and the rightmost tile in the bottom row (52) carries data bit $d_{192}$. The remaining 64 tiles are divided into two groups of 32 tiles; one group always carries the value one, and the other group always carries the value zero. These 64 tiles are arranged in a regular quincunx pattern of ones and zeros; see, for example the 'one' tile (53) and the 'zero' tile (54). These tiles with constant encoded data values are used as 'reference' tiles to aid the decoding of the data as will be explained below.

As explained above, all four quadrants of each field carry the same data. For example, as shown in FIG. 5, the first tile (55) in the second row of the lower left quadrant carries metadata bit $d_1$ equal to the data carried by the first tile (51) in the second row of the top left quadrant; and, the first tile (56) in the first row of the upper right quadrant is a reference tile encoded with the value zero which is also the case for the tile (54) in the first row of the upper left quadrant.

Figure 6:
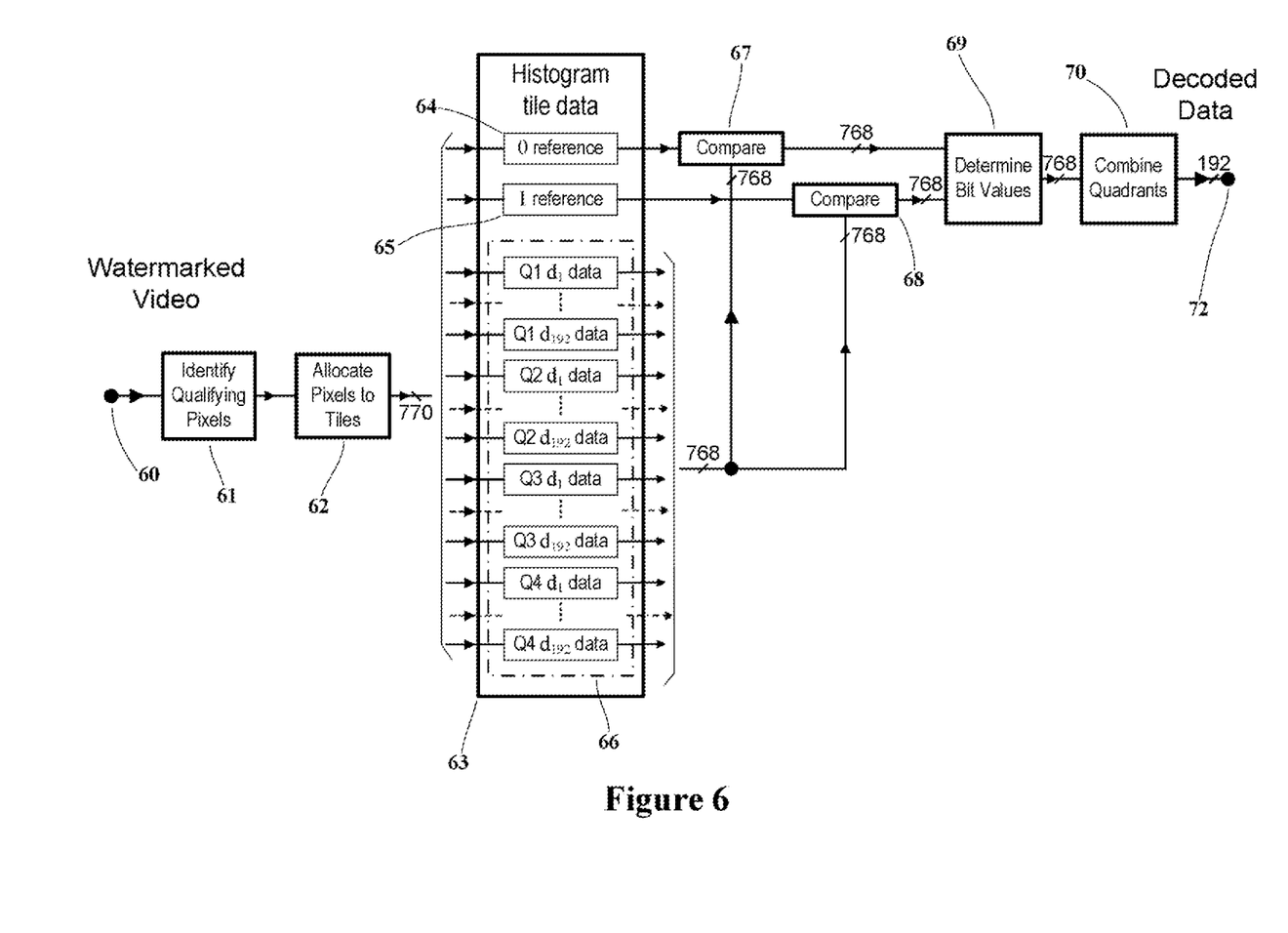
FIG. 6 show a block diagram of a system for decoding metadata encoded according the system of FIG. 3.

The data decoding process is illustrated in FIG. 6. Watermarked video (60) is input to a data-carrying-pixel identification process (61), which operates to detect activity in the same way as the blocks (301) to (306) of FIG. 3, and thus identifies pixels whose values have been modified to carry data. These pixels are allocated to tiles by an allocator (62) which sends the low-significance bits (the bits which can carry metadata) of the pixel values to the appropriate one of 770 pixel-value-frequency analysers (63). The allocator (62) operates in the same way as the blocks (308) and (309) of FIG. 3 to determine the address of the tile in which the current pixel is situated. The values of data-carrying pixels within 'zero' reference tiles are input to a 'zero' pixel-value-frequency analyser (64); and, the values for data-carrying pixels within 'one' reference tiles are input to a 'one' pixel-value-frequency analyser (65). Pixel values for 'data' tiles are input to a respective one of 768 'data' analysers (66), so that every 'data' tile in every quadrant has a unique pixel-value-frequency analyser that analyses data-carrying pixels within that tile.

Each analyser in the set of pixel-value-frequency analysers (63) counts the occurrences of the particular combinations of values of the low-significance bits of the pixel values that it receives, and forms a histogram of the result. In the present example two low-significance bits are used to carry metadata, and so a four-bin frequency histogram is formed, representing the number of occurrences in the current field of each of the four possible two-bit values. The histograms are normalised by dividing the count values by the number of pixels contributing to the respective histogram.

The histograms for the 'data' tiles are compared with the histograms for the 'reference' tiles in comparators (67) and (68). In each case the output from the comparison is a weighted sum of bin-value difference magnitudes, where a high weight is given to the most frequently occurring bin in the respective reference tile histogram. The difference $\Delta_{DR}$ between the histogram D for a data tile and the histogram R for one of the sets of reference tiles is given by the expression:

$$\Delta_{DR} = \Sigma W_j \times |D_j - R_j|$$

Where: j is the histogram bin index;
the summation is over all j bins (four bins in the present example); and,
$W_j$ is a weighting factor that is increased when j is equal to the index of the maximum-value bin of R.

Suitable values for the weighting factor $W_j$ are: unity for the maximum-value bin of R; and, 1/16 for other bins.

The two difference values for each of the 768 'data' tiles are compared in a bit decoder (69) to obtain a binary bit value and an associated 'error' value for each of the metadata bits $d_1$ to $d_{192}$. The logic is as follows:

If the difference from the 'zero' reference histogram is less than the difference from the 'one' reference histogram, then the bit value is zero, and the error value is equal to the difference from the zero reference histogram.

If the difference from the 'one' reference histogram is greater than or equal to the difference from the zero reference histogram, then the bit value is one, and the error value is equal to the difference from the 'one' reference histogram.

The final stage of the data decoding process is to combine (70) the data from the four quadrants to obtain a value for each of the 192 metadata bits. This is done by a majority vote of error-weighted bit values. For example, if the sum of the error values for a decoded value of zero is less than the sum of the error values for a decoded value of one, then the bit value is set to zero. The result of this process is a set of 192 bit values for the metadata decoded from the current field. These are output at terminal (72).

It will often be helpful for the metadata to be protected from errors by means of an error detecting and correcting code such as one of the forms of the well-known Hamming code. For example, the 192 data bits can be organised as 16 12-bit data words, each comprising seven data bits and five error detection and correction bits, giving a net data rate of 112 bits (or 14 bytes) per video field.

Other variations in the implementation of the invention will be apparent to the skilled person from the above description. For example the video may be organised as frames rather than interlaced fields, so that pixels are allocated to tiles that are spatial regions within each frame. Different tests may be used to determine whether pixels are modified to carry metadata, or all pixels may carry data. Fewer or more than two low-significance bits of the pixel values may be modified, and any number of the modified data bits may be set equal to metadata bits.

The number of fields or frames of metadata, associated with previous fields or frames, that are encoded into a current frame may be chosen independently of any anticipated standards conversion process.

Methods different from those described with reference to FIGS. 3 to 6 may be used to encode metadata associated with a previous field or frame into a current field or frame. For example the compression coding parameters of different regions within an image may be modified in dependence on metadata and that metadata may be recovered in conjunction with a compression decoding process.

Examples of embodiments of the invention have been described in terms of streaming sequential processes operating in real time. As the skilled person will appreciate, equivalent processes may be performed using other techniques, including the use of programmable devices or computers, and these processes can operate at rates unrelated to the rate of display or acquisition of the pixels of the video images.

The principles of the invention are equally applicable to stored video data sets or video files where the concepts of 'stream' or 'sequence' are represented by storage address sequence or position within a file.

The invention claimed is:

1. A method of processing a video data stream to encode metadata, comprising:
    receiving in a video processor a sequence of video images, the pixel data of one video image having been modified to encode current metadata associated with that image and to encode other metadata for N other images respectively in the sequence of images, where N is equal to or greater than four;
    testing for validity of the metadata encoded in an image;
    if the metadata encoded in that image is valid, extracting in the video processor the metadata associated with that image and the other metadata for said N other images; and
    associating said other metadata respectively with said N other images.

2. A method according to claim 1 comprising:
    measuring the frequencies of occurrence of at least two combinations of values of low-significance pixel-value bits within a first spatial region within a field or frame;
    measuring the frequencies of occurrence of at least two combinations of values of low-significance pixel-value bits within a second spatial region within the said field or frame; and
    determining an encoded metadata parameter from a comparison of the frequencies of occurrence of combinations of low-significance pixel-value bits in the said first and second spatial regions of the said field or frame.

* * * * *

UNITED STATES PATENT AND TRADEMARK OFFICE
CERTIFICATE OF CORRECTION

PATENT NO. : 9,852,489 B2
APPLICATION NO. : 15/091704
DATED : December 26, 2017
INVENTOR(S) : Jonathan Diggins Page 1 of 1

It is certified that error appears in the above-identified patent and that said Letters Patent is hereby corrected as shown below:

On the Title Page

Please insert the foreign priority:
Item --(30)   Foreign Application Priority Data
    Dec. 12, 2012   (GB) ................................ 1222397.0--

Signed and Sealed this
Tenth Day of April, 2018

Andrei Iancu
*Director of the United States Patent and Trademark Office*